United States Patent [19]

Nishimura

[11] Patent Number: 4,638,431

[45] Date of Patent: Jan. 20, 1987

[54] DATA PROCESSING SYSTEM FOR VECTOR PROCESSING HAVING A CACHE INVALIDATION CONTROL UNIT

[75] Inventor: Hiroyuki Nishimura, Tokyo, Japan

[73] Assignee: NEC Corporation, Tokyo, Japan

[21] Appl. No.: 651,369

[22] Filed: Sep. 17, 1984

[51] Int. Cl.[4] .................... G06F 12/08; G06F 12/00; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,142,234 | 2/1979 | Bean et al. | 364/200 |
| 4,513,367 | 4/1985 | Chan et al. | 364/200 |
| 4,525,777 | 6/1985 | Webster et al. | 364/200 |

OTHER PUBLICATIONS

Computing Surveys, vol. 14, No. 3, "Cache Memories" by Alan Jay Smith, pp. 473-530, Sep. 1982, Assoc. for Computing Machinery.

Primary Examiner—James D. Thomas
Assistant Examiner—William G. Niessen
Attorney, Agent, or Firm—Sughrue, Mion, Zinn, Macpeak & Seas

[57] ABSTRACT

A data processing system for vector processing having a main memory accessible in parallel by a plurality of processors, each processor having a cache memory, wherein, in response to a storage instruction given to the main memory by a processor, a main memory block of a given size (BS) and having a give start address (B) and containing element data spaced at an interelement distance (D) being preempted as a result of the storage instruction, a single block address invalidation takes place at each cache memory previously having data stored at that main memory location, the single block address invalidation corresponding to (BS/D) cache address invalidations, whereby repeated sequential individual cache address invalidation operations for each address in the preempted block no longer are required.

2 Claims, 5 Drawing Figures

DATA PROCESSING SYSTEM FOR VECTOR PROCESSING HAVING A CACHE INVALIDATION CONTROL UNIT

BACKGROUND OF THE INVENTION

The present invention relates to a data processing system for vector processing which has a cache invalidation control unit for invalidating an address registered in a cache directory.

In a conventional data processing system having a store-through cache memory, data in a cache memory must be the same as data in a main memory. Particularly, for a cache memory control in a multiprocessor system wherein each processor has a cache memory and shares a single main memory with the other processors, a reference can be made to the paper entitled "Cache Memories" presented by ALAN JAY SMITH in "Computing Surveys," Vol. 14, No. 3, pp. 473-530, September, 1982. In the disclosed multiprocessor system, when a certain processor stores data in the main memory, the main memory address for the store operation is broadcast to all the other processors sharing the same main memory in the system. Then, each processor determines whether data associated with the store address is present in its cache memory. If data is present, the processor normally is required to invalidate that data in the cache, or else is required to update it to make it the same as the main memory data. A major difficulty in broadcasting store addresses lies in that every cache memory in the system is forced to surrender a cycle for invalidation lookup whenever any processor performs a store operation.

A system for fast and efficient cache invalidation control is disclosed in U.S. Pat. No. 4,142,234, for example. In accordance with that disclosed system, a buffer invalidation address stack (BIAS) filter memory is associated with each cache in a multiprocessor system. This filter memory serves to filter out repeated requests to invalidate the same block in a cache as disclosed in column 2 of the U.S. Pat. No. 4,142,234. This operation enhances the efficiency of invalidation. In this type of multiprocessor system, where a certain processor executes a move character instruction to store data in contiguous addresses of the main memory, invalidation requests associated with the contiguous addresses accumulate in the BIAS so that the filtering effect conforming to the block size of the cache memory may be expected. However, the problem with such a system is that since a store address is outputted from the BIAS in response to each store, difficulty is experienced in determining how long a store address should be held in the BIAS and how large the entry size of the BIAS should be. Another problem is that where data made up of a certain number of elements is to be stored in the addresses of the main memory at equal distances by a single instruction, or a parallel store is to be executed by increasing the number of interleaves of the main memory, it is necessary for the above-described system to collect invalidation addresses in parallel and such cannot be implemented without increasing the number of hardware elements required.

SUMMARY OF THE INVENTION

It is, therefore, an object of the present invention to provide a data processing system for vector processing which solves the problem discussed above.

According to one aspect of the invention, there is provided a data processing system for vector processing which comprises: a main memory; a parallel vector operation unit having a plurality of interfaces to the main memory for accessing a plurality of element data; at least one scalar operation unit having a cache memory; and a cache invalidation control unit for performing a control for invalidating a cache memory address which is stored in a cache directory. The cache invalidation control unit comprises the cache directory for holding block address data associated with data stored in the cache memory; an address generation circuit for generating cache invalidation interrogation addresses based on a start address of a vector store instruction, a distance between element data, and a number of vector store elements; a detection circuit for checking whether a block address applied thereto from the address generation circuit and including vector store addresses is filed in the cache directory or a copy of the cache directory and, if filed, generating a coincidence signal; an invalidation circuit for invalidating an associated filed address of the cache directory in response to the coincidence signal outputted from the detection circuit; an element number check circuit for checking a number of vector elements contained in a block of the cache memory with respect to a distance between the vector store elements in a block of the cache memory, generating a signal associated with the number of vector elements; and a cache invalidation address filtering instruction circuit for delivering an instruction to the address generation circuit to filter out the cache invalidation addresses in the same block of the cache memory and update in response to the output of the element number check circuit so that a preceding cache invalidation address may be left as it is or a next cache invalidation address may replace said preceding cache invalidation address when said preceding cache invalidation address is identical to the next cache invalidation address.

BRIEF DESCRIPTION OF THE DRAWINGS

The objects, features and advantages of the present invention will become more apparent from the following detailed description taken with the accompanying drawings in which.

In all drawings, the same reference numerals denote the same structural elements.

DETAILED DESCRIPTION OF THE INVENTION

Figure 1:
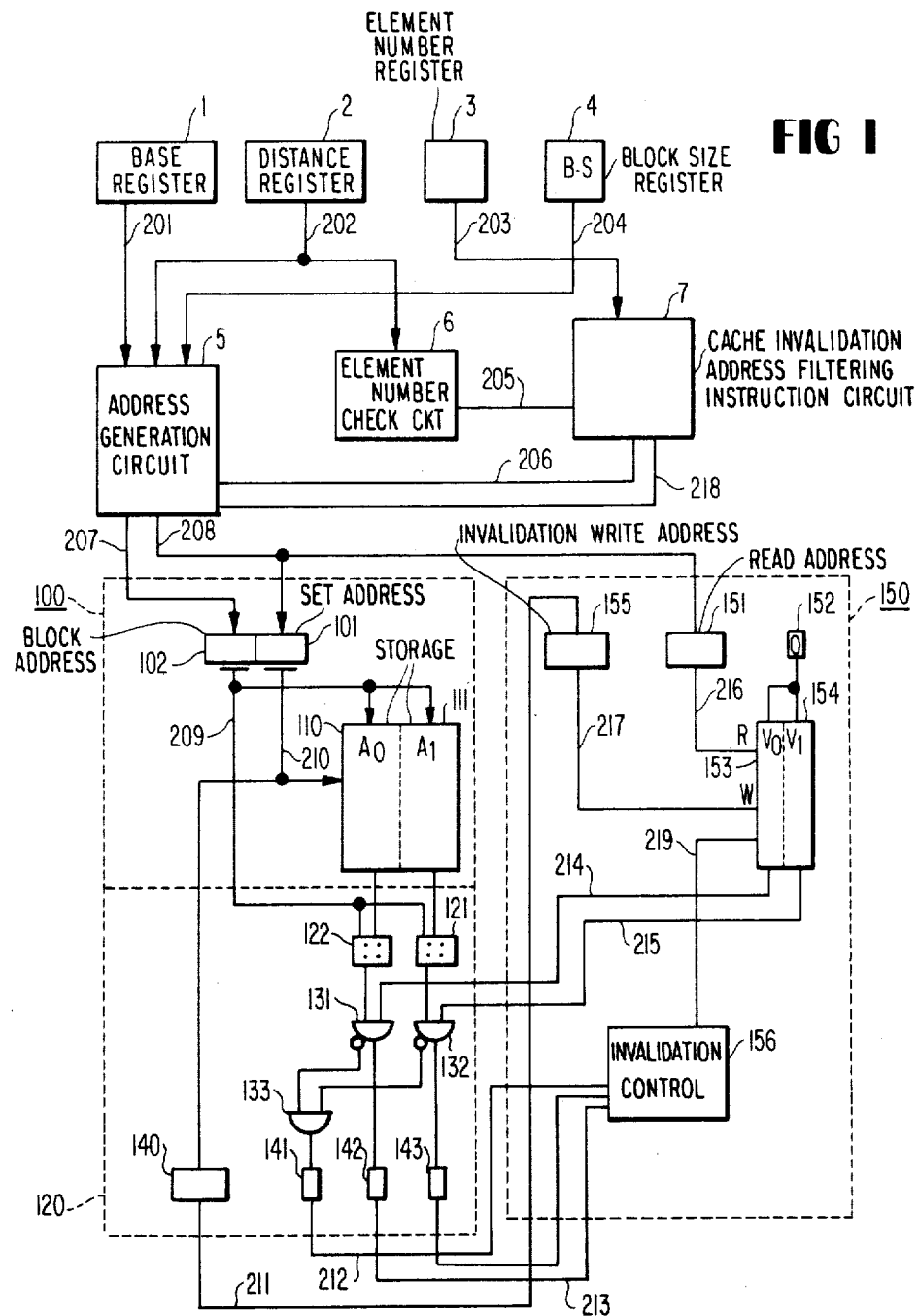
FIG. 1 shows an embodiment of the present invention.

Referring to FIG. 1, a data processing system for vector processing embodying the present invention comprises a base register 1, a distance register 2, an element number register 3, a block size register 4, an address generation circuit 5, an element number check circuit 6, a cache invalidation address filtering instruction circuit 7, a cache directory 100, an invalidation circuit 150, and transfer paths 201 to 207.

The cache directory 100 comprises a set address register 101, a block address register 102, storage elements 110 and 111, compare circuits 121 and 122, gates 131 to 133, and registers 140 to 143.

The invalidation circuit 150 comprises a V-bit read address register 151, V-bit storage elements 153 and 154, a V-bit invalidation write address register 155, and an invalidation control circuit 156.

Figure 2:
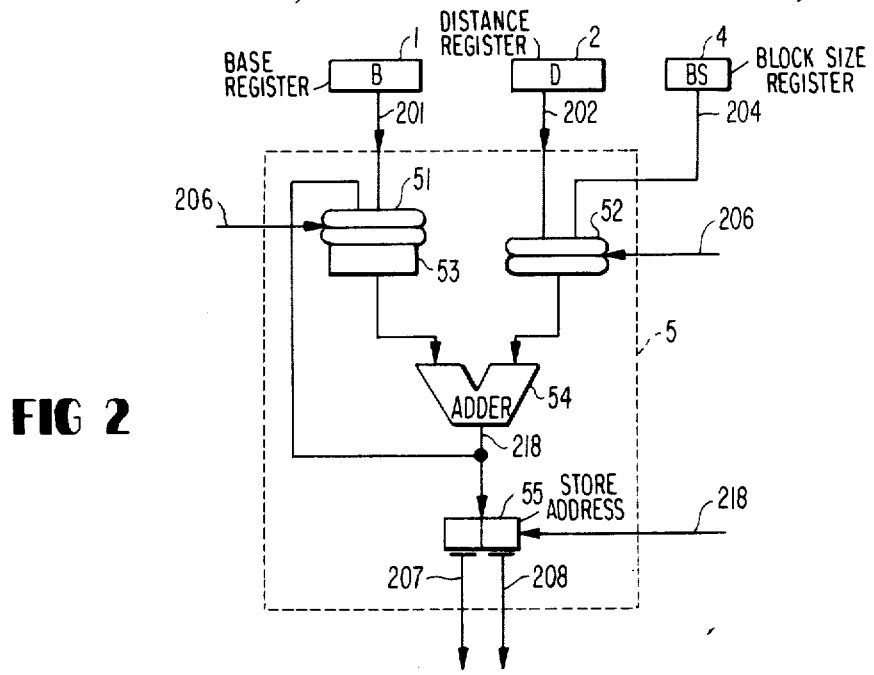
FIG. 2 is a diagram of a detailed construction of an address generation circuit 5 shown in FIG. 1.

Referring to FIG. 2, the address generation circuit 5 comprises two-input switch circuits 51 and 52, an adder 54, and a store address register 55.

Figure 3:
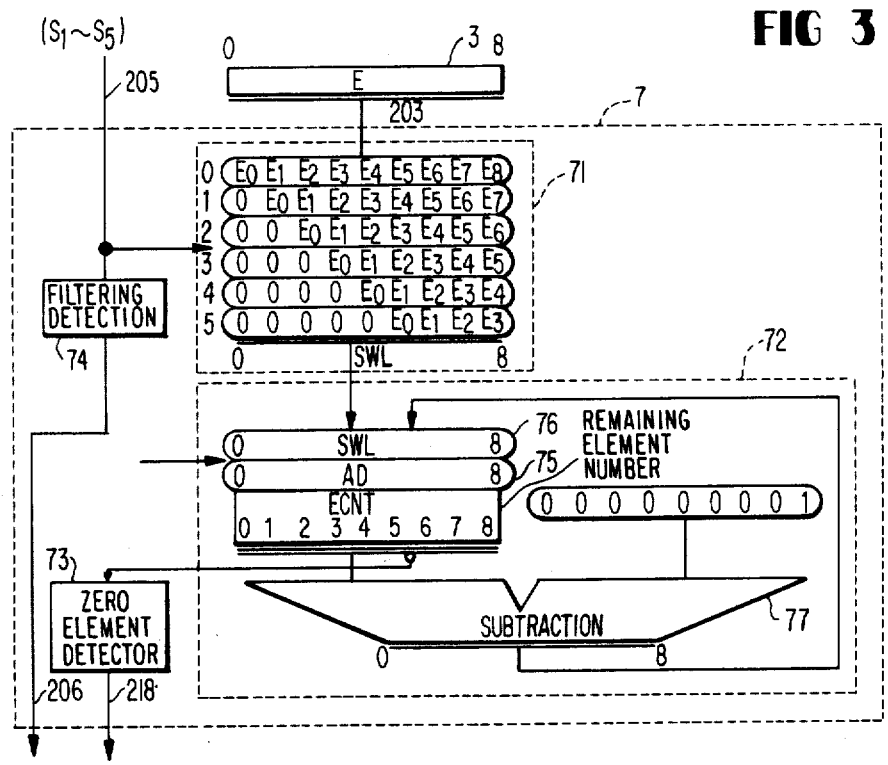
FIG. 3 is a diagram of a detailed construction of a cache invalidation address filtering instruction circuit 7 shown in FIG. 1.

Referring to FIG. 3, the cache invalidation address filtering instruction circuit 7 comprises a six-input switch circuit 71, a zero element detector circuit 73, a filtering detection circuit 74, and a remaining element number subtract circuit 72 having a remaining element number register 75, a two-input switch circuit 76, and a subtractor 77.

Figure 5:
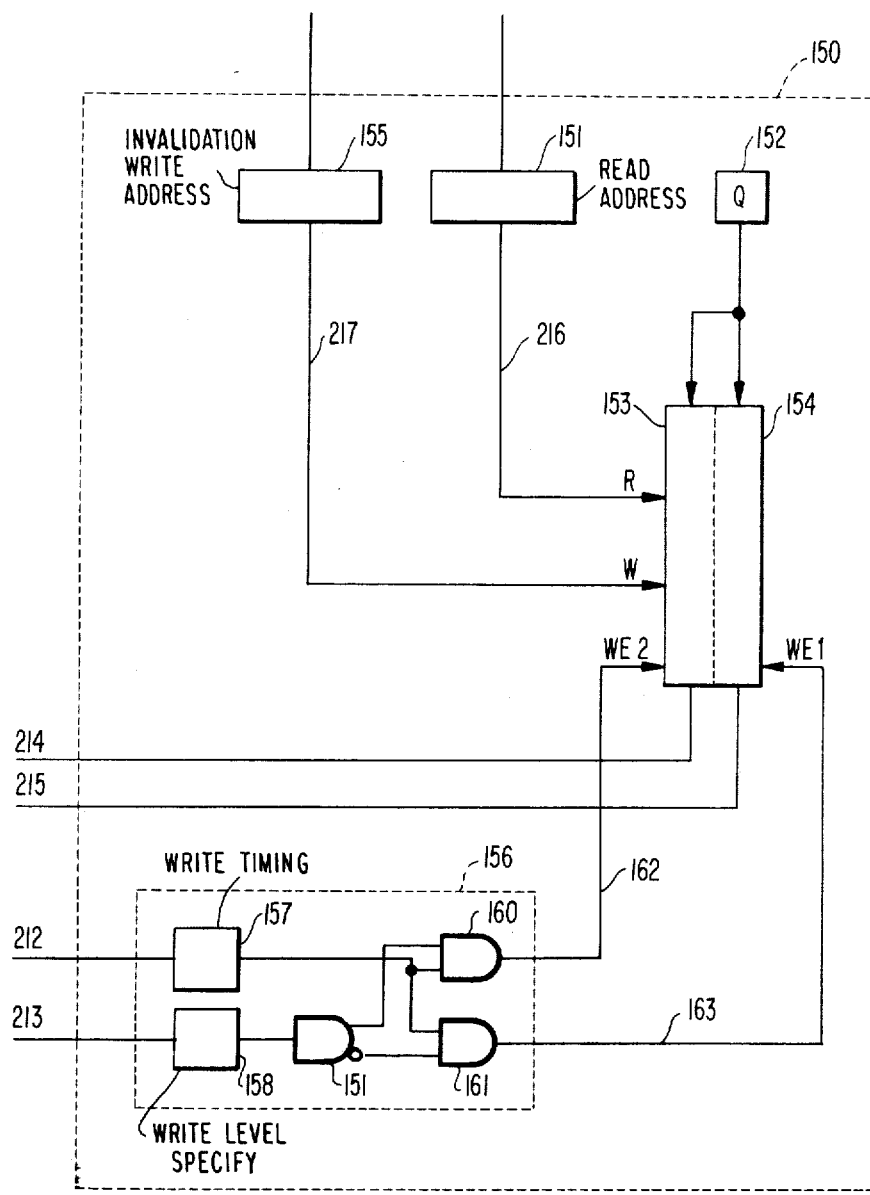
FIG. 5 is a diagram of a detailed construction of an invalidation control circuit 150 contained in invalidation circuit 150, as shown in FIG. 1.

Referring to FIG. 5, the invalidation control circuit 156 of FIG. 1 comprises a write timing register 157, a write level specify register 158, AND/NAND gate 159, and AND gates 160 and 161.

The embodiment above mentioned operates as follows.

Referring to FIG. 1, the base register 1 and the distance register 2 deliver respectively a start address (B) of a vector store and a vector store interelement distance (D) address generation circuit 5 via the paths 201 and 202.

Referring to FIG. 2, the address generation circuit 5 generates vector addresses $B+D$, $B+2D$, $B+3D$, ..., $B+(E-1)D$ (E: number of elements indicated by the element number register 3), the successive result being loaded in the store address register 55 on a machine cycle basis. The two-input switch circuit 51 is controlled over a control line 206 to select the path 201 at the first generation of store addresses and, thereafter, a transfer path 218. The two-input switch circuit 52 continuously selects the path 202 until an instruction is applied via the line 206.

The high order portion of the store address (cache block address data) and the low order portion of the store address (set address) are fed via transfer paths 207 and 208 to the registers 102 and 101, respectively, in the cache directory 100.

Referring again to FIG. 1, the cache in accordance with this particular embodiment has a two level (or two compartment) construction, a level 0 cache and a level 1 cache (not shown).

The level 0 storage element 110 and the level 1 storage element 111 have filed respectively the block addresses corresponding to the data of the part of the main memory, which are stored in the level 0 and level 1 caches, in the main memory in matching relation with set addresses indicated by the set address register. In the invalidation circuit 150, the contents of the level 0 V-bit storage element 153 and that of the level 1 V-bit storage element 154 show whether or not the contents of their associated storage elements 110 and 111 are valid. In this particular embodiment, the valid state of each of the storage elements 153 and 154 is represented by $V=1$ and the invalid state by $V=0$.

From the address generation circuit 5, the set address is applied to the V-bit read address register 151 simultaneously with its delivery to the set address register 101.

Block address data filed in the cache directory 100 is read out from addresses of the level 0 storage element 110 and level 1 storage element 111 which are designated by an output 210 of the set address register 101. The compare circuits 121 and 122 compare respectively the block address data from the storage elements 110 and 111 with the content of the block address register 102. The AND/NAND gates 131 and 132 provide respective ANDed outputs of the compare circuits 121 and 122 and outputs 214 and 215 of the storage elements 153 and 154, which are designated and read out by an output 216 of the register 151. The ANDed outputs are loaded respectively into the level 0 coincidence register 142 and the level 1 coincidence register 143, while the NANDed outputs of gates 131 and 132 are applied to the NAND gate 133. The NAND output of the gate 133 is loaded into the cache coincidence register 141. In response to "1" of the register 141, set address data associated with the coincidence is delivered from the coincidence address register 140 to the V-bit invalidation write address register 155 via the path 211. Then, the invalidation circuit 150 receives at its invalidation control circuit 156 a coincidence signal 212 outputted from the register 141 and a 0 level coincidence signal from the register 142 (or 143).

First, the write timing register 157 and write level specify register 158 (FIG. 5) are set. The output of the register 157 is applied to AND gates 160 and 161; the output of register 158 is applied to AND/NAND gate 159. The AND output of the gate 159 is applied as one input of the AND gate 160, and the NAND output of the gate 159 is applied as one output of the AND gate 161. The AND gates 160 and 161 respectively write instruction signal 162 or a 1 level write instruction signal 163. In response to the instruction signal 163, 0 output of the bit invalidation write register 152 is written in a position designated by the V-bit invalidation write address register 155, thereby invalidating the 0 level or the 1 level.

Cache invalidation processing associated with vector store addresses may be understood from the above description.

Hereinafter will be described in detail the element number check circuit 6 and the cache invalidation address filtering instruction circuit 7 which are the characteristic features of the present invention.

Figure 4:
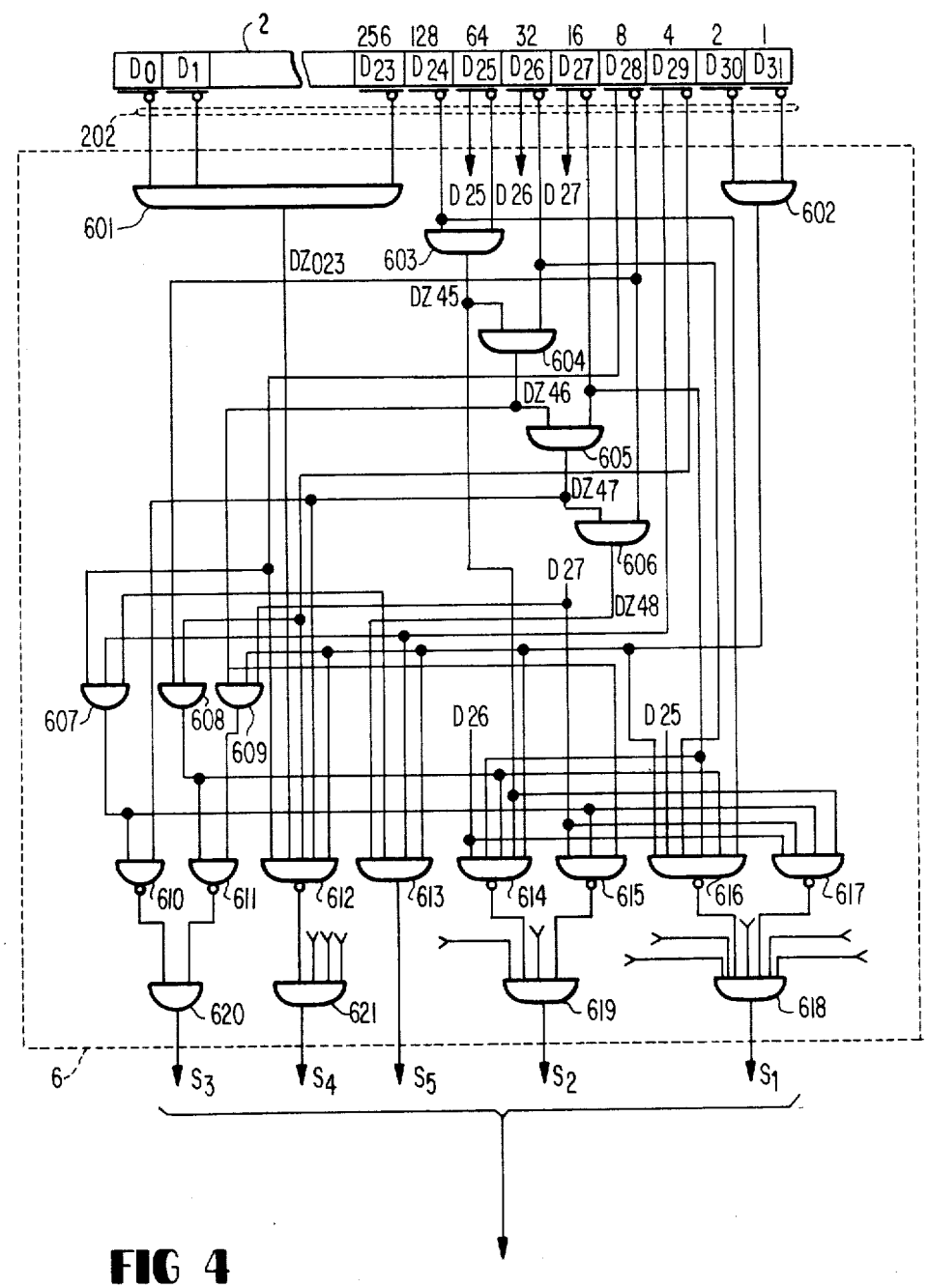
FIG. 4 is a diagram showing an element number check circuit 6 of FIG. 1 in detail.

In the embodiment shown in FIGS. 1, 3 and 4, it is assumed that the cache block size (BS) is 128 bytes, the vector store data is 4 bytes wide, and the minimum interelement distance is 4 bytes. The base register 1 and the distance register 2 each have 32-bit byte address data, while the element number register 3 is capable of indicating $2^9$ elements with 9 bits.

While the illustrative embodiment has treated the distance register 2 in terms of positive values, it may naturally deal with stores wherein the distances are negative and the direction is opposite, although for simplicity such an embodiment has not been described.

Referring to FIG. 4, a number of interelement distances ($D_{0-31}$) are delivered from the distance register 2 to the element number check circuit 6 via the path 202. The circuit 6 classifies interelement distances into six kinds, i.e., {interelement distance=(4 bytes), (5 to 8 bytes), (9 to 16 bytes), 17 to 32 bytes), (33 to 64 bytes), (more than 64 bytes)}.

Specifically, where the interelement distance is 4 bytes and the block size (BS) is 128 bytes, 128/4 (32) vector elements may be stored in one cache block address. Stated another way, invalidating one block is in effect equivalent to invalidating 32 successive cache addresses. So processing a plurality of vector store addresses as a single invalidation address is herein referred to as "address filtering processing". In the same manner, the invalidation addresses may be filtered to 128/8 (16) in the case of the interelement distances 5 to 8, 128/16 (8) in the case of the interelement distances 9 to 16, 128/32 (4) in the case of the interelement distances 17 to 32 bytes, and 128/64 (2) in the case of the interelement distances 33 to 64.

Referring to FIG. 4, AND gates 601 to 609, 613 and 618 to 621 and NAND gates 610 to 612 and 614 to 617 constitute part of a gate circuit for classifying the interelement distance as one of the six kinds. Description will proceed assuming a circuit responsive to the fact that the interelement distance is 4 bytes. In order that the interelement distance be 4 bytes, the contents ($D_{0-31}$) of the distance register 1 should be $D_{29}=1$, $D_{0-28}=0$, and $D_{30,31}=0$. The gates 601 to 606 accept the inverted contents of $D_{0-28}$ and $D_{30,31}$ to detect the contents $D_{0-28}=0$ and $D_{30,31}=0$, while the gate 613 ANDs the contents and $D_{29}$ to thereby develop a 4-byte detection signal $S_5$. In the same manner, a signal $S_4$ appears as a 5 to 8 byte detection signal, a signal $S_3$ as a 9 to 16 byte detection signal, a signal $S_2$ as a 17 to 32 byte detection signal, and a signal $S_1$ as a 33 to 64 byte detection signal.

The signal $S_1$ to $S_5$ is applied along line 205 to the cache invalidation address filtering instruction circuit 7. In parallel with the signal $S_1$ to $S_5$, a number of elements (E) is supplied along line 203 from the element number register 3 to the circuit 7. The six-input switch circuit 71 serves as a shift circuit associated with (E/1), (E/2), (E/4), (E/8), (E/16), and (E/32). Among them, one associated with the signal $S_1$ to $S_5$ is selected to reduce the number of cache invalidation.

Referring to FIG. 3, the remaining element number subtract circuit 72 is repeatedly sequentially decremented by one until the filtered number of elements becomes zero. The successive subtraction result is loaded in the remaining element number register 75 and each output of the latter is checked by the zero element detector 73. Upon detection of zero, an end of invalidation processing signal 218 is applied to the address generation circuit 5 (FIG. 1) so as to terminate the vector store address preparing operation. Until the appearance of the signal 218, the filtering detector 74 continuously checks whether any of the signals $S_1$ to $S_5$ is appearing and, if appearing, generates a switch signal 206. As shown in FIG. 2, the output of the register 4 is selected in response to one input of the adder 54 so that store addresses $B+BS$, $B+2 \cdot BS$, $B+3 \cdot BS$, . . . , $B+\{E/(2^x)+1\} \cdot BS$ are produced, where $2^x \simeq (BS/D)$.

As described above, the construction in accordance with the present invention enhances the processing efficiency of a system which checks, in response to a vector store, whether a block associated with a vector store address has been filed in a scalar cache memory and, if so, the associated file is invalidated.

It will be noted that a plurality of units comprising a cache directory 100, an address generation circuit 5 and an invalidation circuit 150 may be employed, instead of the single set shown and described, in order to make processing even more efficient.

In the illustrative embodiment, a consideration has been given only to the number of vector store elements contained in a single block and not to the start address (B) of a vector store and, instead, the next block is additionally invalidated. However, a system which takes the start address into account is also within the scope of the present invention.

In summary, it will be seen that the present invention allows cache invalidation processing to be performed not on a vector store address basis but on a block address basis by checking the number of vector store elements contained in a single block of a cache memory.

What is claimed is:

1. In a data processing system for vector data processing and scalar data processing including:
   a main memory;
   parallel vector operation means for performing vector data processing, having a plurality of interfaces to said main memory for accessing element data; and
   scalar operation means for performing scalar data processing, having a cache memory unit coupled to said main memory;
   a cache memory unit, associated with said scalar operation means, comprising:
   a cache memory for storing groups of data;
   cache directory means for holding block address data associated with data stored in said cache memory; and
   cache invalidation control means for invalidating an address of said cache directory;
   said cache invalidation control means comprising:
   address generation means for generating cache invalidation addresses corresponding to store addresses of vector element data for vector store instructions which define a start address, a distance between element data, and a number of vector store elements, indicated by said vector store instructions;
   detection means for checking whether or not a block address including said cache invalidation addresses which are applied to said detection means from said address generation means is filed in the cache directory or a copy of the cache directory and, if filed, generating a coincidence signal;
   invalidation means for invalidating an associated filed address of the cache directory in response to the coincidence signal outputted from said detection means;
   element number check means for checking a number of vector elements contained in a block by checking a distance between the vector store elements in said block and generating a signal corresponding to the number of vector elements in and the size of said block; and
   cache invalidation address filtering instruction means for delivering an instruction to said address generation means to filter out said cache invalidation address in response to the output of the element number check means.

2. A data processing system comprising:
   a main memory having a plurality of interfaces for accessing element data stored therein;
   at least one processing means connected to one of said interfaces, each of said at least one processing means having a cache memory;
   cache directory means for holding first block address data corresponding to element data stored in said main memory which also is stored in said cache memory, said first block address data identifying a block having a predetermined size and containing elements spaced a predetermined distance apart; and cache invalidation control means for invalidating a plurality of cache invalidation addresses of said cache directory means in a single invalidation operation, in response to second block address data, by comparing said first and second block address data and performing said invalidation operation if said first and second block address data coincide, wherein said cache invalidation control means comprises:

address generation means for generating said plurality of cache invalidation addresses in accordance with a start address of a vector store instruction and said predetermined distance;

invalidation means for invalidating main memory addresses corresponding to said plurality of cache invalidation addresses;

filtering means for preventing individual invalidation of a cache invalidation address not coinciding with said first block address data;

detection means capable of detecting whether each of said plurality of cache invalidation addresses is stored in said cache directory means, and capable of outputting a coincidence signal to said invalidation means in accordance with the outcome of a detection operation; and element number check means for checking a number of elements contained in a block of said main memory and generating a signal corresponding to said predetermined distance and a size of said block, said filtering means outputting a signal to said address generation means, whereby said address generation means filters out ones of said plurality of cache invalidation addresses in accordance with the output of said element number check means.

* * * * *

UNITED STATES PATENT AND TRADEMARK OFFICE
CERTIFICATE OF CORRECTION

PATENT NO. : 4,638,431
DATED : January 20, 1987
INVENTOR(S) : Hiroyuki NISHIMURA It is certified that error appears in the above-identified patent and that said Letters Patent is hereby corrected as shown below:

| | |
|---|---|
| COLUMN 3, LINE 31 | After "(D)" insert -- to the -- |
| COLUMN 4, LINE 24 | After "signal" insert -- 213 -- |
| COLUMN 4, LINE 68 and COL. 5, LINE 1 | After "block" delete "address" |
| COLUMN 5, LINE 1 | After "block" insert -- address -- |

Signed and Sealed this

Twenty-fifth Day of August, 1987

Attest:

DONALD J. QUIGG

Attesting Officer

Commissioner of Patents and Trademarks